UNITED STATES PATENT OFFICE.

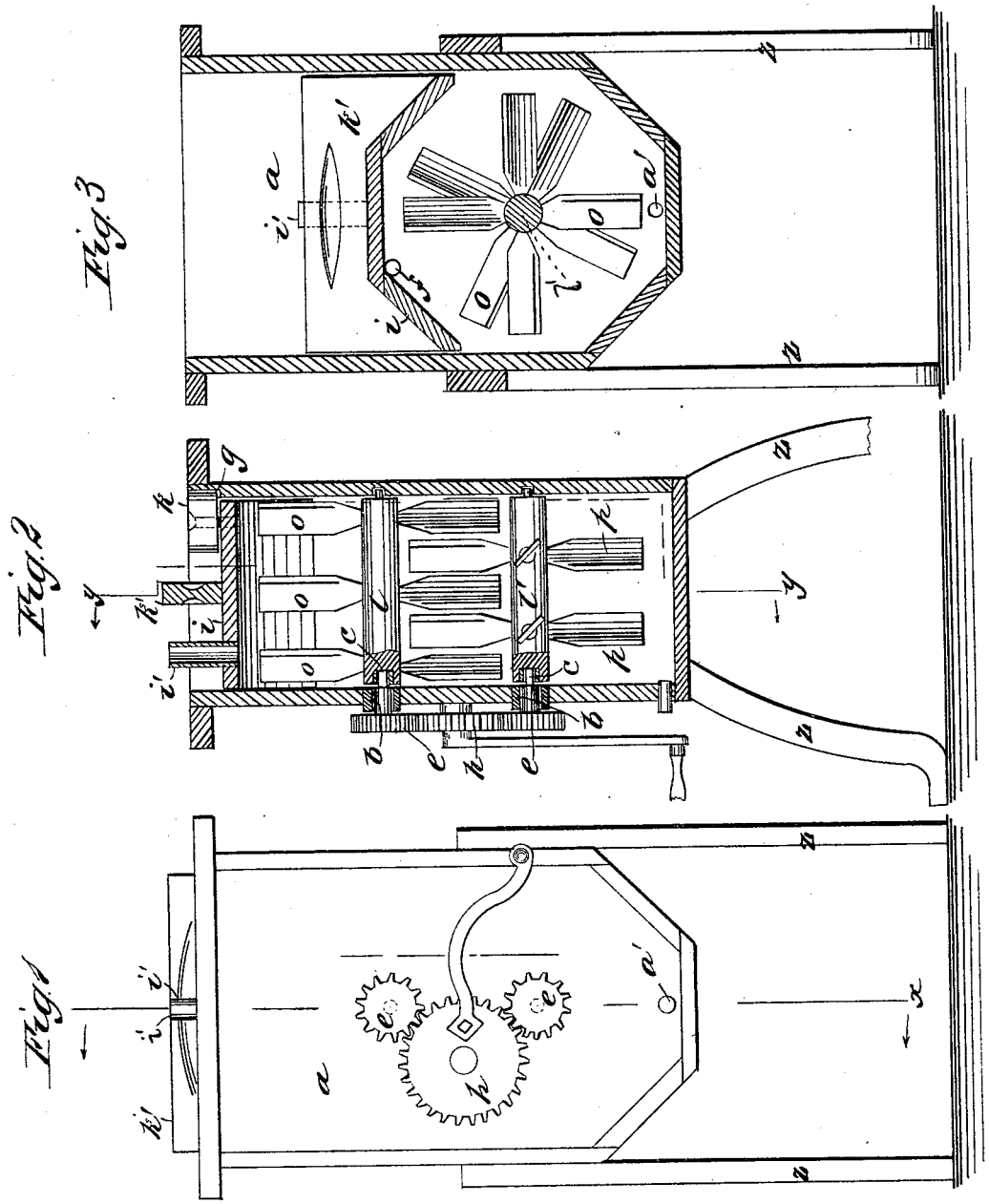

NELSON SMITH, OF KEARNEY, NEBRASKA.

CHURN.

SPECIFICATION forming part of Letters Patent No. 389,331, dated September 11, 1888.

Application filed November 29, 1887. Serial No. 256,411. (No model.)

*To all whom it may concern:*

Be it known that I, NELSON SMITH, of Kearney, in the county of Buffalo and State of Nebraska, have invented a new and useful Improvement in Churns, of which the following is a full, clear, and exact description.

My invention relates to improvements in churns; and it consists in the peculiar construction and arrangement of parts, as hereinafter described, and pointed out in the claims.

Reference is to be had to the accompanying drawings, forming a part of this specification, in which similar letters of reference indicate corresponding parts in all the figures.

Figure 1 is a view in side elevation of my improved churn, showing its driving mechanism. Fig. 2 is a central longitudinal section of the same, taken on the line $x\,x$ in Fig. 1, showing the paddle-shafts and their paddles. Fig. 3 is a vertical section of the same, taken on the line $y\,y$ in Fig. 2, the upper shaft being removed.

Referring to said drawings, $a$ is the case of the churn, constructed with vertical sides and ends and a nearly semicircular bottom, supported upon legs $z$. In one of its sides is an aperture, $a'$, which is closed by a plug or any other suitable means. Said side is constructed with suitable openings to receive collars $b$, which afford bearings for shafts $c$, having square heads and carrying gear-wheels $e$. A driving-wheel, $h$, adapted to be turned by a crank, is supported upon a stud on said side, so that its teeth engage with those of the gear-wheels $e$. A lug, $f$, is located on the interior of one side, and a recess, $g$, in the upper end of the other. The cover $i$ corresponds in shape to the bottom of the case, and is provided with a tube, $i'$, a rotatable stop, $k$, and a handle, $k'$.

The paddle-shafts $l\,l'$ are constructed with journals at one end suited to fit into sockets in the interior of one side of the case $a$, and with recesses in the other end suited to receive the square heads of the shafts $c$. About the circumference of the shaft $l$ are set in a spiral line the paddles $o$, and around the shaft $l'$ are set in circular lines the paddles $p$, said paddles being disposed so as to present their blades at an obtuse angle to each other, and so that on the approaching sides of the shafts the paddles of one set intervene those of the other set. The length of said paddles is such that when revolved they will just clear the top, bottom, and ends of the case and the paddle-shaft adjacent to them. The paddles are also set far enough apart to prevent the colliding of one set with the other. Power being applied to the driving-wheel $h$ its teeth gear with those of the wheels $e$ and set the paddle-shafts $l\,l'$ in motion, causing the paddles to pass each other in opposite directions. The paddles on said shafts keep the contents of the churn constantly agitated, and continuously beat, grind, and rub the butter-sacs against each other, between and against the paddle-shafts and interior of the case $a$ until every portion of the milk or cream has been acted upon, a complete disintegration of said sacs takes place, and their butter is eliminated from them. When a large quantity of cream or milk is to be churned, both of the paddle-shafts are used. The cover $i$ is prevented from interfering with the revolution of the upper set of paddles by turning its stop $k$ until it rests in the recess $g$. If but a small quantity is to be churned, the upper paddle-shaft is removed by drawing out its shaft $c$, so as to disengage the head of the said shaft from the socket in the end of the paddle-shaft, when the said paddle-shaft can be moved endwise to disengage its projection from the socket in the case $a$, after which it can be readily removed. The cover $i$ is then placed in the position shown in Fig. 3 by turning its stop $k$ out of the recess $g$ and slipping said cover down into the case $a$ until it rests upon the lug $f$.

The lower paddle-shaft is unmounted and removed from the case in a similar manner to that described above for the upper paddle-shaft.

Having thus described my invention, what I claim as new, and desire to secure by Letters Patent, is—

1. In combination with a churn-case constructed with a recess, $g$, and lug $f$, the detachable cover $i$, provided with a rotatable stop, $k$, and a handle, $k'$, substantially as shown and described.

2. An improved churn consisting of the case $a$, provided with the recess $g$ and lug $f$, the shafts $l\,l'$, provided with the paddles $o\,p$, the gear-wheels $e\,e\,h$, and the cover $i$, provided with the rotatable stop $k$, substantially as described.

NELSON SMITH.

Witnesses:
GEO. A. WAY,
C. O. SMITH.